April 7, 1953

F. CARLSTEDT 2,633,884

ABRADER FOR PEELING VEGETABLES

Filed Feb. 24, 1948

INVENTOR.
Fredrik Carlstedt
BY
his ATTORNEY

Patented Apr. 7, 1953

2,633,884

UNITED STATES PATENT OFFICE 2,633,884

ABRADER FOR PEELING VEGETABLES

Fredrik Carlstedt, Stockholm, Sweden, assignor to Aktiebolaget Elektrolux, Stockholm, Sweden, a corporation of Sweden Application February 24, 1948, Serial No. 10,204
In Sweden December 3, 1938

Section 1, Public Law 690, August 8, 1946
Patent expires December 3, 1958

9 Claims. (Cl. 146—49)

This invention relates to an apparatus for peeling or paring potatoes and other vegetables, and particularly those having a skin or outer layer which must be removed preparatory to cooking the vegetables or placing the same in condition for consumption.

One of the objects of the invention is to provide a device of this character of relatively simple but effective construction, by means of which the vegetables are caused to be impinged or moved over an abrading surface which causes the skin or outer layer of the vegetables to be removed uniformly, speedily and without manual effort on the part of the operator.

More particularly, the invention contemplates the provision of a rotating receptacle in the form of a cup or bowl, said receptacle having its mouth disposed upwardly and being provided with a smooth and imperforate bottom upon which is removably supported an abrading member preferably in the form of a disk. Arranged within the receptacle and maintained against the inner vertical wall surface of the same, is at least one adjustable deflector blade which tends to direct the vegetables, upon rotation of the receptacle in which the same are contained, toward the center of the receptacle and over the abrading disk contained therein, so that the vegetables are maintained in more or less constant motion while the device is in operation with the result that the vegetables are peeled or pared with rapidity and ease.

The invention further contemplates the provision of means for detachably securing the abrading disk in position within the receptacle, whereby the disk may be placed in position and readily removed therefrom whenever desired without the use of tools, thereby permitting the receptacle to be put to other uses, such as for example, mixing or agitating foods or other products.

These and other objects of the invention are attained by the invention, a more particular description of which will hereinafter appear and be set forth in the claims appended hereto.

In the accompanying drawing, wherein an illustrative embodiment of the invention is disclosed:

Figure 1:
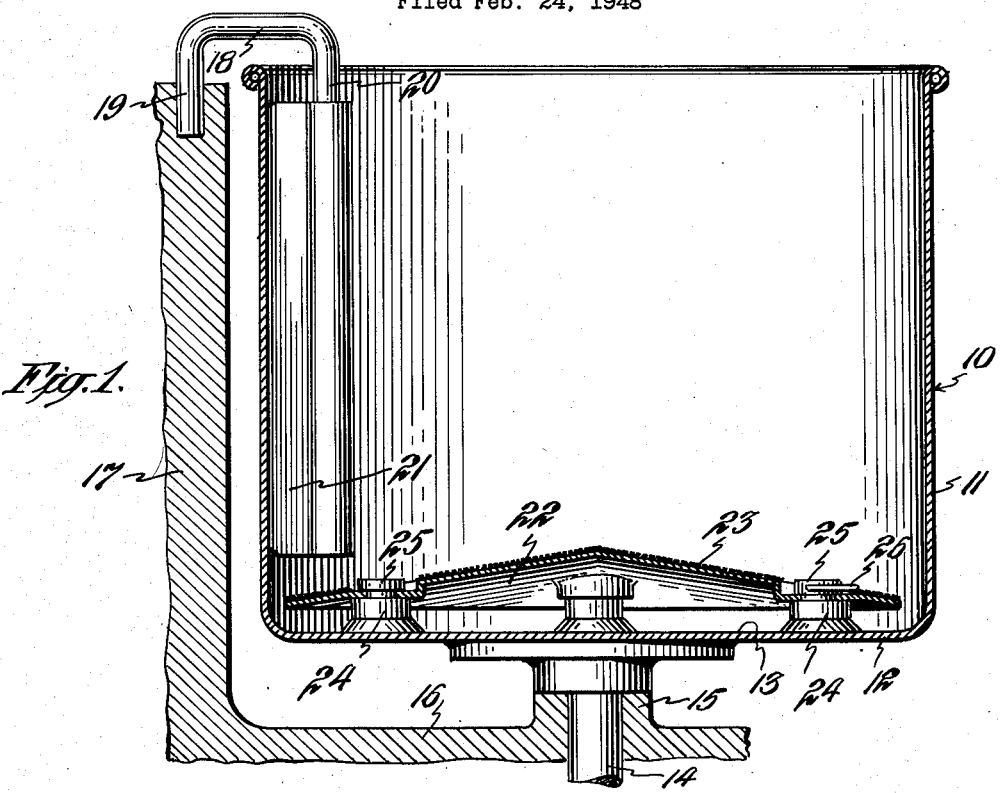
Fig. 1 is a vertical sectional view through the improved peeling apparatus.

With reference to the drawing, 10 indicates the body of the receptacle in which the vegetables, such as potatoes, to be peeled are placed. In the form shown, the receptacle is of one-piece construction and of generally cylindrical form, and includes the vertical side wall 11 and the integrally formed bottom 12, the latter being preferably provided with a smooth upper surface 13. A shaft 14 is located centrally of the receptacle 10 and is secured to and extends downwardly from the bottom of the same, said shaft being rotatively supported in a boss 15 formed on a base or stand, a portion of which is shown at 16. The base or stand 16 may be part of the housing of a mixing machine or similar device, and the vertical shaft 14 entering into said housing may be driven by gearing or other suitable propulsion means, from a motor contained within the housing, such means being not herein illustrated since the same are known in this art. It is sufficient to state that the shaft 14 is rotated at the required speed, thus causing the receptacle 10, secured to said shaft 14 to be correspondingly rotated.

Figure 2:
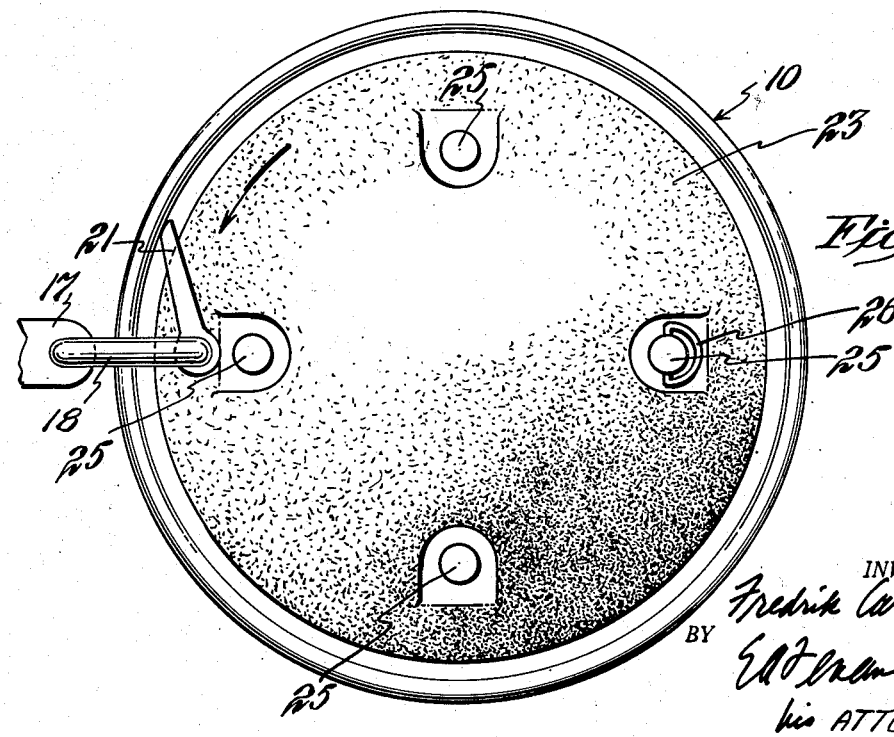
Fig. 2 is a top plan view of the same.

In the form shown, the stand or base member 16 is formed with an upstanding portion 17 in which is adjustably supported a bent rod or yoke 18, having a downwardly-bent end 19 rotatively adjustable in the portion 17 and possibly also vertically adjustable therein. At its opposite end, the rod 18 is formed with a downwardly-dependent portion 20 on which is mounted a deflector blade 21 which extends angularly from its point of attachment to the portion 20 to the inner surface of the vertical wall 11 of the receptacle 10, the angularity of the blade being more clearly shown in Fig. 2 and the direction of rotation of the receptacle 10 being therein indicated by the arrow. While I have herein shown but one of the deflectors 21, several of the same can be employed if it is found expedient or desirable to use more than one of them. The arrangement above described is such that the angularity of the deflector blade may be altered, if desired, and the same may also be raised or lowered within the receptacle.

The abrading or peeling disk is shown at 22, the same, in the form shown, being in the nature of a flat cone with its convex side disposed uppermost. The disk may be a metal plate having a roughened or abrasive upper surface 23 in the form of a renewable or replaceable sheet of silicon carbide like that available under the trademark Carborundum. It might also be in the form of an abrasive coating applied directly to the upper surface of the disk 22, or plate disposed on top of the disk might be provided with roughly-punched grater-holes, or edges or corrugations can be produced on the disk in other ways. Therefore, in herein referring to the disk 22 as an "abrading disk," I wish to be understood as contemplating any of the arrangements above set forth, or other capable of applying an abrading action to the vegetables contained within the receptacle 10 and rotated therewith.

It is desired that the abrading disk 22 be removably secured within the receptacle 10 and for this purpose I provide a plurality of rubber suction cups 24 having shank portions 25 anchored in apertures formed through the disk. Since the upper face 13 of the bottom 12 of the receptacle 10 is smooth, the cups 24 will firmly adhere to the same when pressed against said surface, thus securely, yet removably, attaching the disk 22 in place within the receptacle. Thus, when the receptacle 10 is rotated, the disk 22 will be rotated therewith. To facilitate the manual removal of the disk 22 from inside of the receptacle, the shank 25 of one of the suction cups is provided with a wire loop 26 constituting a handle which is grasped between the fingers to enable the disk 22 to be lifted. The loop is arranged to be folded down as shown, when not in use, and may be counter-sunk into the top of the disk.

In operation, the vegetables to be peeled are placed within the receptacle 10 which is then rotated and the vegetables, being rapidly moved over the upper face of the disk 22 are subjected to an abrading action by the abrasive surface 23 thereon and are quickly peeled. While the receptacle 10 is rotated, the vegetables, coming into contact with the deflector blade 21 will be forced thereby toward the center of the disk, or tumbled inwardly over the abrasive face thereof with the result that the peeling operation is quickly performed.

It is to be noted that the securement of the abrading disk 22 to the interior of the receptacle 10 is such that the receptacle 10 is not required to be perforated to permit the attachment of the disk. Hence, when the disk 22 is removed, the interior of the receptacle is rendered free of depressions, recesses or projections, thus permitting the receptacle to be used for mixing or other food treating purposes.

In view of the foregoing, it will now be understood that the rubber suction cups 24 broadly constitute fastening members whose extreme bottom surfaces abut regions of the inner smooth surface 13 of the bottom 12 of vessel 10 and are disposed in their entirety on top of such smooth surface 13 when the abrading disk 22 is mounted in position within the vessel. Moreover, the fastening members 24 are capable of gripping the bottom 12 of the vessel by a holding force which acts directly against the extreme bottom surfaces of such members and can be readily overcome manually without the use of tools.

While I have shown one embodiment of the invention, it is obvious that changes may be readily made in the same without departing from the spirit of the invention. For example, while the disk 22 is shown in the form of a relatively flat cone, with the convex side uppermost, it might be reversed with a concave side disposed upwardly, or it might be flat or of some other shape. Also, while I have shown a plurality of equally-spaced suction cups for attaching the disk 22 to the bottom of the receptacle 10, possibly a large, centrally located, single suction cup might be used. These and other changes are comprehended as within the scope of the invention and the claims appended hereto.

What I claim is:

1. Apparatus for peeling objects, such as potatoes and the like, for example, comprising an upright vessel having a bottom and upstanding side wall mounted for rotation about a vertical axis, the inner surfaces of the bottom and side wall of the vessel being substantially smooth, means including at least one vertically disposed deflecting member having a surface extending from one region to another region which is further removed from the axis of rotation of the vessel and nearer to the upstanding side wall and against which objects in the vessel and at the vicinity of the upstanding side wall thereof come in contact during rotation of the vessel, supporting means for such member, an element, fastening means for detachably securing said element to the bottom of the vessel, said fastening means being of the suction grip type to facilitate quick attachment of said element to the bottom of the vessel and easy detachment therefrom without the use of tools, and said fastening means and element forming a unitary abrading unit having a top roughened surface which acts in an abrasive manner on objects caused to move in contact therewith during rotation of the vessel.

2. Apparatus for peeling objects, such as potatoes and the like, for example, comprising an upright vessel having a bottom and upstanding side wall mounted for rotation about a vertical axis, the inner surfaces of the bottom and side wall of the vessel being substantially smooth, means including at least one vertically disposed deflecting member having a surface extending from one region to another region which is further removed from the axis of rotation of the vessel and nearer to the upstanding side wall and against which objects in the vessel and at the vicinity of the upstanding side wall thereof come in contact during rotation of the vessel, supporting means for such deflecting member, said deflecting member being adjustable on such supporting means to a number of positions at different obtuse angles with respect to successive portions of the upstanding side wall approaching said member during rotation of the vessel, an element, fastening means for detachably securing said element to the bottom of the vessel, said fastening means being of the suction-cup type to facilitate quick attachment of said element to the bottom of the vessel and easy detachment therefrom without the use of tools, and said element when secured to the bottom of the vessel having a top roughened surface which acts in an abrasive manner on objects caused to move in contact therewith during rotation of the vessel.

3. Apparatus for peeling objects, such as potatoes and the like, for example, comprising an upright vessel having an imperforate bottom and an upstanding side wall mounted for rotation about a vertical axis, the inner surfaces of the bottom and side wall of the vessel being substantially smooth, means including at least one vertically disposed deflecting member having a surface extending from one region to another region which is further removed from the axis of rotation of the vessel and nearer to the upstanding side wall, supporting means for said deflecting member, the upstanding side wall defining the maximum distance through which objects can move radially outward from the axis of rotation of the vessel when said deflecting member is supported therein, an element, fastening means for detachably securing said element to the bottom of the vessel, said fastening means being of the suction-cup type to facilitate quick attachment of said element to the bottom of the vessel and easy detachment therefrom without the use of tools, said element when secured to the bottom of the vessel having a top roughened surface which acts in an abrasive manner on objects caused to move in contact therewith during rotation of the vessel.

4. Apparatus as set forth in claim 3 including a handle fixed to said element to facilitate detaching the latter from the bottom of the vessel, said element having a recess to receive said handle, and said handle being movable into and from the recess.

5. Apparatus for peeling objects, such as potatoes and the like, for example, comprising an upright vessel having a bottom and upstanding side wall mounted for rotation about a vertical axis, the inner surfaces of the bottom and side wall of the vessel being substantially smooth, means including at least one vertically disposed deflecting member having a surface extending from one region to another region which is further removed from the axis of rotation of the vessel and nearer to the upstanding side wall and against which objects in the vessel and at the vicinity of the upstanding side wall thereof come in contact during rotation of the vessel, supporting means for such deflecting member, said deflecting member being angularly adjustable on said supporting means about a vertical axis and also bodily toward and from the inner surface of the upstanding side wall, a disk or plate adapted to be positioned immediately adjacent the bottom of the vessel and having an upper roughened surface which acts in an abrasive manner on the outer surfaces of the objects caused to move and come in contact therewith during rotation of the vessel, and fastening means for detachably securing said disk or plate firmly to the smooth inner surface of the bottom of the vessel, said fastening means being of the suction grip type and formed of resilient material to facilitate quick attachment of the disk or plate to the bottom of the vessel and easy detachment therefrom without the aid of tools.

6. Apparatus for peeling objects, such as potatoes and the like, for example, comprising an upright vessel having an imperforate bottom and upstanding side wall mounted for rotation about a vertical axis, the inner surfaces of the bottom and side wall of the vessel being substantially smooth, the upstanding side wall defining the maximum distance through which objects can move radially outward from the axis of rotation of the vessel during rotation of the latter, a disk or plate adapted to be positioned immediately adjacent the bottom of the vessel and having an upper roughened surface which acts in an abrasive manner on the outer surfaces of the objects caused to move and come in contact therewith during rotation of the vessel, and fastening means of the suction grip type for detachably securing said disk or plate firmly to the bottom of the vessel at the smooth inner surface thereof, said fastening means facilitating quick attachment of the disk or plate to the bottom of the vessel and easy detachment therefrom without the aid of tools.

7. Apparatus for peeling objects, such as potatoes and the like, for example, comprising an upright vessel having an imperforate bottom and upstanding side wall mounted for rotation about a vertical axis, the inner surfaces of the bottom and side wall of the vessel being substantially smooth, a disk or plate adapted to be positioned immediately adjacent the bottom of the vessel and having an upper roughened surface which acts in an abrasive manner on the outer surfaces of the objects caused to move and come in contact therewith during rotation of the vessel, and fastening means formed of resilient material and of the suction grip type for detachably securing said disk or plate firmly to the smooth inner surface of the bottom of the vessel, said fastening means facilitating quick attachment of the disk or plate to the bottom of the vessel and easy detachment therefrom without the aid of tools.

8. Apparatus for peeling objects, such as potatoes and the like, for example, comprising an upright vessel having bottom and upstanding side wall mounted for rotation about a vertical axis, the inner surfaces of the bottom and side wall of the vessel being substantially smooth, the upstanding side wall defining the maximum distance through which objects can move radially outward from the axis of rotation of the vessel, a disk or plate adapted to be positioned immediately adjacent the bottom of the vessel and having an upper roughened surface which acts in an abrasive manner on the outer surfaces of the objects caused to move and come in contact therewith during rotation of the vessel, and fastening means comprising a plurality of suction cups formed of resilient material for detachably securing said disk or plate firmly to the smooth inner surface of the bottom of the vessel, said fastening means facilitating quick attachment of the disk or plate to the bottom of the vessel and easy detachment therefrom without the aid of tools.

9. Apparatus for peeling objects, such as potatoes and the like, for example, comprising an upright vessel having an imperforate bottom and upstanding side wall mounted for rotation about a vertical axis, the inner surfaces of the bottom and side wall of the vessel being substantially smooth, means including at least one vertically disposed deflecting member having a surface extending from one region to another region which is further removed from the axis of rotation of the vessel and nearer to the upstanding side wall and against which objects in the vessel and at the vicinity of the side wall thereof come in contact during rotation of the vessel, supporting means for such deflecting member, said deflecting member being angularly adjustable on such supporting means about two vertical axes, the upstanding side wall defining the maximum distance through which objects in the vessel can move radially outward from the axis of rotation of the vessel when said deflecting member is positioned therein, an element, and fastening means formed of resilient material and of the suction-cup type for detachably anchoring said element firmly to the bottom of the vessel at the top surface thereof, said element in its anchored position having a top roughened surface which acts in an abrasive manner on objects caused to move in contact therewith during rotation of the vessel.

FREDRIK CARLSTEDT.

REFERENCES CITED

The following references are of record in the file of this patent:

UNITED STATES PATENTS

| Number | Name | Date |
|---|---|---|
| 847,328 | Franklin | Mar. 19, 1907 |
| 1,355,393 | De Ghetto | Oct. 12, 1920 |
| 1,966,501 | Hoe | July 17, 1934 |
| 2,138,716 | Truitt | Nov. 29, 1938 |
| 2,442,600 | Horton | June 1, 1948 |

FOREIGN PATENTS

| Number | Country | Date |
|---|---|---|
| 288,953 | Germany | Nov. 29, 1915 |
| 627,408 | Germany | Mar. 14, 1936 |
| 99,663 | Sweden | June 20, 1940 |